United States Patent [19]
Wildenberg

[11] Patent Number: 6,088,627
[45] Date of Patent: Jul. 11, 2000

[54] PROCESS FOR THE MANUFACTURE OF MECHANICAL PARTS

[75] Inventor: Francois Wildenberg, Contrexeville, France

[73] Assignee: Constructions Mécaniques des Vosges Marioni, Rozieres sur Mouzon, France

[21] Appl. No.: 08/871,399

[22] Filed: Jun. 6, 1997

[30] Foreign Application Priority Data

Jun. 6, 1996 [FR] France .................................. 96 07183

[51] Int. Cl.$^7$ ............................. G06F 17/50; G06F 19/00
[52] U.S. Cl. ........................ 700/172; 700/160; 700/186; 700/187; 700/191
[58] Field of Search ................................... 700/172, 160, 700/186, 187, 191

[56] References Cited

U.S. PATENT DOCUMENTS

| | | | |
|---|---|---|---|
| 4,538,956 | 9/1985 | Kalkbrenner et al. | 414/735 |
| 4,564,914 | 1/1986 | Ballough et al. | 364/475 |
| 4,791,583 | 12/1988 | Colburn | 345/420 |
| 5,063,800 | 11/1991 | Jung et al. | 83/14 |
| 5,289,383 | 2/1994 | Sawamura et al. | 364/474 |
| 5,410,645 | 4/1995 | Ooka et al. | 395/142 |
| 5,453,934 | 9/1995 | Taghavi et al. | 364/474.24 |

FOREIGN PATENT DOCUMENTS

| | | |
|---|---|---|
| 0459251 | 12/1991 | European Pat. Off. . |
| WO 9217313 | 10/1992 | WIPO . |

Primary Examiner—William Grant
Assistant Examiner—Iván Calcaño
Attorney, Agent, or Firm—Gary M. Cohen

[57] ABSTRACT

A process for machining mechanical parts, including the milling of parts having a complex shape, includes the steps of determining the volume of the part to be machined, defining a corresponding machining grid, plotting the machining grid defined for the volume of the part to be machined, programming the plotted machining grid, and machining the part, grid line by grid line, according to the established programming. The process is implemented with an apparatus including a machining head coupled with a tool support. The tool support for the machining head (e.g., a cutting tool head) is positioned to face a predetermined point of the grid line to be machined, and immobilized. The machining head is mobilized to machine the desired grid line, with the tool support remaining fixed. Following this, the tool support is positioned and immobilized to face a predetermined point for the following grid line to be machined and the machining head is mobilized to machine the next grid line, with the tool support remaining fixed.

9 Claims, 1 Drawing Sheet

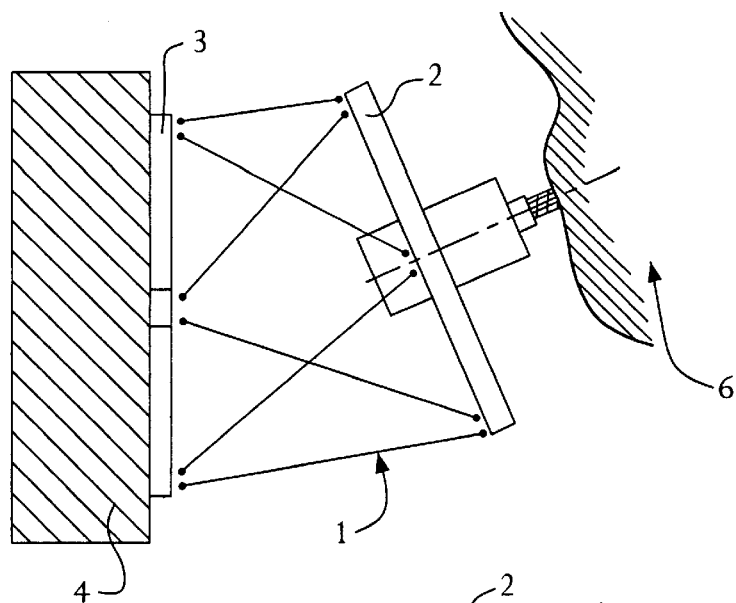
FIG. 1
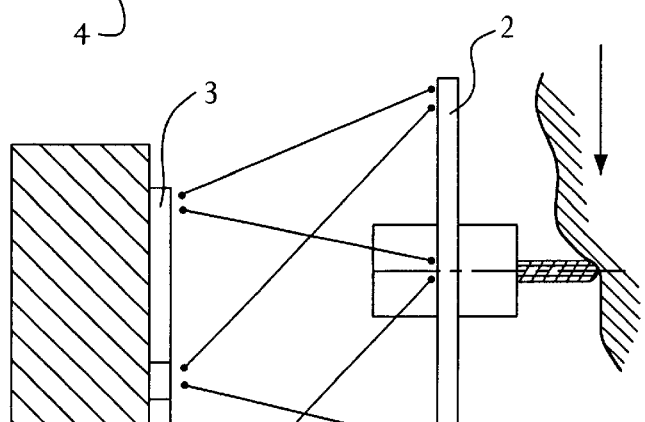
FIG. 2
FIG. 3
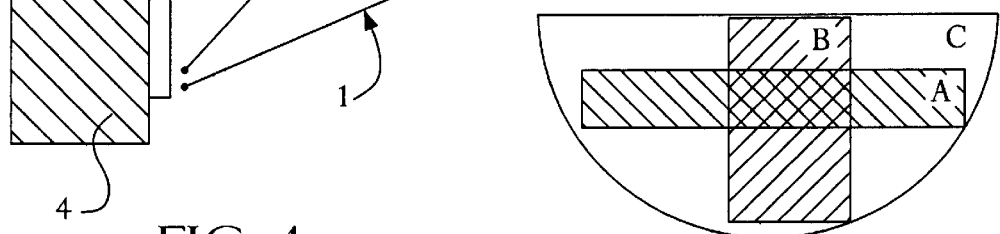
FIG. 4
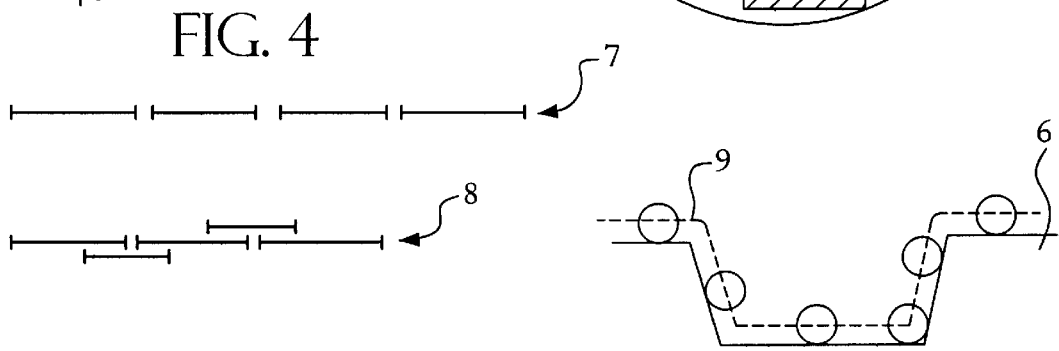
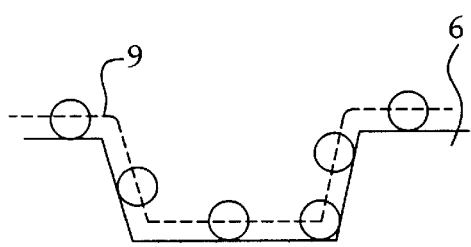
FIG. 5

PROCESS FOR THE MANUFACTURE OF MECHANICAL PARTS

BACKGROUND OF THE INVENTION

The present invention relates to a process for the machining of mechanical parts, and especially but not exclusively for the milling of parts having a complex shape.

Many machining devices for industrial applications are already known. For example, milling is traditionally performed on a milling machine, by displacement under a cutting tool turning at a speed appropriate for the part to be machined. This can include end milling, in which the surface to be machined is perpendicular to the area of the cutting tool, and rolling milling, in which the surface to be machined is parallel to the axis of the cutting tool.

The drawbacks of these devices arise from the problems encountered in the machining of parts with complex shapes. In particular, such machining generally requires the use of powerful information-processing devices.

It is, therefore, the object of the present invention to develop a simple machining process that can be used for the machining of mechanical parts, even if their shapes are complex.

SUMMARY OF THE INVENTION

According to the present invention, a process is provided for the machining of mechanical parts, especially for the milling of mechanical parts of complex shape, which includes a determination of the volume of the part to be machined, followed by the definition of a machining grid based on the determined volume. The machining grid for the volume of the part to be machined is then plotted, followed by appropriate programming of the plotted machining grid. The part is then machined, grid line by grid line, responsive to the established programming.

In a variant of the process of the present invention, the volume of the part to be machined is determined by guide points. In another variant of the process, one or more grids are defined on the basis of their machining requirements.

The processes of the present invention are innovative because they make it possible to better rationalize the machining work to be performed.

Further in accordance with the present invention, a process is provided for machining parts, grid line by grid line, which includes positioning of the tool support of the machining head (e.g., a cutting tool head), and immobilizing the tool support, to face a predetermined point of the grid line to be machined. The machining head is then mobilized, and operates to machine the grid line, with the tool support remaining fixed. The tool support is then positioned (and immobilized) to face a predetermined point of the following grid line to be machined, and the mobile machining head operates to machine the next grid line, with the tool support remaining fixed.

Advantageously, the predetermined point of the grid line to be machined is in the center of the grid line.

The processes of the present invention are preferably implemented with a hexapod milling head.

A more detailed understanding of the invention is provided by the non-limiting description provided with reference to the attached drawings.

BRIEF DESCRIPTION OF THE DRAWINGS

FIG. 1 is an illustration of machining on five simultaneous axes.

FIG. 2 is an illustration of machining on parallel planes.

FIG. 3 is an illustration of a work volume of a hexapod.

FIG. 4 is an example of grid plotting according to the present invention.

FIG. 5 is an example of a volume machined by guide points.

DETAILED DESCRIPTION OF THE PREFERRED EMBODIMENTS

As is well known, a the hexapod is comprised of six legs (1), the length of which varies by means of a guide motor attached to each leg. Each leg is provided with an articulation at both ends. The six ends of the six articulations of the six legs are rigidly attached to one plane while the opposing (six) ends are rigidly attached to another plane.

One of the planes, which will be referred to as the fixed plate (3), is attached rigidly attached to a tool support (4). The other plane is mobile and is referred to as the mobile plate (2).

A specific machining tool, for example, a high-speed milling spindle, is fit on the mobile plate.

By simultaneously guiding the six motors of the six legs, one can produce translation, tilting and extension movements. Thus, a hexapod milling head is produced.

In to a first method for implementing the present invention, the volume of the part to be machined is determined. To accomplish this, the volume to be machined can be determined manually, by an operator, or by specific measurement means which are themselves known and which, therefore, will not be described here. A machining grid is in this way defined.

The machining grid can comprise a small volume or a large volume of a simple shape, such as a parallelepiped or of a very complex shape, such as the maximum volume that the machining head can theoretically cover. Thus, one can completely define the volume of the part to be machined (6) by a group of "subvolumes".

The machining grid is projected volumetrically on the part to be machined obtaining a cut-away of the part in graph form. This is referred to as the "plotting" of the volume of the part to be machined.

The small volumes can all be identical, or of different types. For example, FIG. 3 illustrates the use of three volumes (A, B and C). In this example, the volume to be machined can be covered:

by type A grids (long width parallelepiped),
by type B grids (long length parallelepiped),
by type C grids (schematic representation of a maximum volume that a hexapod milling head could cover), or
by a combination of these three types of grids.

These volumes can be juxtaposed (7), slightly superposed, parallel juxtaposed and superposed (8), as shown in FIG. 4. In addition, these volumes cannot extend (including in a parallel direction) beyond the volume of the part to be machined.

The support is positioned and immobilized opposite to a predetermined point of the grid, or at the center of the first grid line. Then, very high-speed machining is performed, for example, on five simultaneous axes of this grid. The support is immobile during this phase. Only the machining head (via the mobile plate) moves so as to perform the machining of the grid.

The tool support is displaced and is positioned and immobilized opposite to a predetermined point, or at the center of the following grid line, and machining is recommended. This process is followed for the entirety of the part.

The positioning point is predetermined according to the working requirements of the machining to be performed. The machining is guided by appropriate information-processing devices, which are themselves known.

In a variation of the process of the present invention, the surface of the volume is defined by guide points (9). As shown in FIG. 5, these guide points define the volume through which the tool travels.

Depending on the milling requirements, one can use a tool with a spherical end or a toric tool.

Because of its significant flexibility, the process of the present invention notably enables machining with five simultaneous axes at normal speed, machining with two or three simultaneous axes at high speed and machining with five simultaneous axes at high speed.

Application of the present invention is not limited to milling, but can be applied to all types of machining.

In addition, the present invention is noteworthy because it can be implemented using existing tools.

What is claimed is:

1. A process for machining mechanical parts, including milling of parts having a complex shape, wherein the parts have a volume and wherein the process comprises the steps of:
    determining the volume of the part to be machined;
    defining a machining grid comprised of a plurality of grid lines, responsive to the determined volume of the part;
    plotting the defined machining grid for the volume of the part to be machined;
    programming the plotted machining grid; and
    machining the part, grid line by grid line, responsive to the programming and using a tool support coupled with a machining head, wherein the machining includes the steps of:
        supporting the tool support and the machining head so that the tool support is positioned to face a predetermined point of a first grid line to be machined, and so that the tool support is immobilized;
        mobilizing the machining head and machining the first grid line, with the tool support remaining fixed;
        positioning the tool support and the machining head so that the tool support is positioned to face a predetermined point of a second grid line to be machined following the machining of the first grid line, and so that the tool support is immobilized; and
        mobilizing the machining head and machining the second grid line, with the tool support remaining fixed;
    wherein the predetermined point of each arid line to be machined is at the center of the grid line.

2. The process of claim 1 wherein the determining step is performed using a plurality of guide points.

3. The process of claim 1 wherein the defining step includes the step of establishing a single machining grid.

4. The process of claim 1 wherein the defining step includes the step of establishing a plurality of machining grids.

5. The process of claim 1 which further includes the step of machining additional grid lines following the machining of the second grid line.

6. The process of claim 1 which further includes the step of machining each grid line with a cutting tool head.

7. A process for machining mechanical parts, including milling of parts having a complex shape, wherein the mechanical parts are to be machined grid line by grid line using a tool support coupled with a machining head, and wherein the process comprises the steps of:
    supporting the tool support and the machining head so that the tool support is positioned to face a predetermined point of a first grid line to be machined, and so that the tool support is immobilized;
    mobilizing the machining head and machining the first grid line, with the tool support remaining fixed;
    positioning the tool support and the machining head so that the tool support is positioned to face a predetermined point of a second grid line to be machined following the machining of the first grid line, and so that the support is immobilized; and
    mobilizing the machining head and machining the second grid line, with the tool support remaining fixed;
    wherein the predetermined point of each grid line to be machined is at the center of the grid line.

8. The process of claim 7 which further includes the step of machining additional grid lines following the machining of the second grid line.

9. The process of claim 7 which further includes the step of machining each grid line with a cutting tool head.

* * * * *